United States Patent
Yang

(10) Patent No.: US 8,058,820 B2
(45) Date of Patent: *Nov. 15, 2011

(54) UNI-DIRECTIONAL LIGHT EMITTING DIODE DRIVE CIRCUIT IN PULSED POWER PARALLEL RESONANCE

(76) Inventor: Tai-Her Yang, Dzan-Hwa (TW)

( * ) Notice: Subject to any disclaimer, the term of this patent is extended or adjusted under 35 U.S.C. 154(b) by 354 days.

This patent is subject to a terminal disclaimer.

(21) Appl. No.: 12/351,912

(22) Filed: Jan. 12, 2009

(65) Prior Publication Data
US 2009/0179591 A1 Jul. 16, 2009

Related U.S. Application Data

(60) Provisional application No. 61/020,809, filed on Jan. 14, 2008.

(51) Int. Cl.
*H05B 41/36* (2006.01)

(52) U.S. Cl. ......... 315/307; 315/291; 315/250; 315/224

(58) Field of Classification Search .................. None
See application file for complete search history.

(56) References Cited

U.S. PATENT DOCUMENTS

| 2005/0122062 | A1* | 6/2005 | Hsu ........................ 315/291 |
| 2009/0021185 | A1* | 1/2009 | Ng ........................ 315/294 |
| 2010/0308751 | A1* | 12/2010 | Nerone ................... 315/312 |
| 2010/0320931 | A1* | 12/2010 | Radermacher et al. ........ 315/291 |

* cited by examiner

*Primary Examiner* — Shawki S Ismail
*Assistant Examiner* — Jany Tran
(74) *Attorney, Agent, or Firm* — Rabin & Berdo, P.C.

(57) ABSTRACT

The present invention uses the capacitive, inductive, or resistive impedance component to constitute the first impedance, and uses the inductive impedance component and capacitive impedance component which produce parallel resonance after parallel connection to constitute the second impedance, whereby the first impedance and the second impedance are series connected for inputting pulsed DC power, and the divided power thereof is rectified to drive the uni-directional light emitting diode.

17 Claims, 7 Drawing Sheets

UNI-DIRECTIONAL LIGHT EMITTING DIODE DRIVE CIRCUIT IN PULSED POWER PARALLEL RESONANCE

BACKGROUND OF THE INVENTION (a) Field of the Present Invention

The unidirectional light emitting diode drive circuit in pulsed power parallel resonance of present invention is disclosed a drive circuit that using a pulsed power as the power source, and by using the capacitive impedance component, or the inductive impedance component or the resistive impedance component to constitute the first impedance, and using the inductive impedance component and the capacitive impedance component in parallel connection, whereof its inherent parallel resonance frequency is the same as the pulse period of the pulsed power to appear parallel resonance status, to constitute the second impedance, whereby the first impedance and the second impedance are series connected, whereof it is characterized in that the two ends of the first impedance and the second impedance in series connection are provided to receive a DC pulsed power input, whereby the DC pulsed power input is divided by the first impedance and the second impedance of parallel resonance in series connection to produce a divided power which is rectified by a rectifier device to an uni-directional DC power, whereby to drive the uni-directional light emitting diode.

(b) Description of the Prior Art

The conventional light emitting diode drive circuit using AC or DC power source is usually series connected with current limit resistors as the impedance to limit the current to the light emitting diode, whereof the voltage drop of the series connected resistive impedance always result in waste of power and accumulation of heat which are the imperfections.

SUMMARY OF THE PRESENT INVENTION

The present invention is disclosed by that a pulsed power is used as the power source, the first impedance is constituted by the capacitive impedance component, or the inductive impedance component or the resistive impedance component, and the second impedance is constituted by an inductive impedance component and a capacitive impedance component in parallel connection, whereof its inherent parallel resonance frequency is the same as the pulse period of the pulsed power to appear parallel resonance status, whereof the two ends of the first impedance and the second impedance in series connection are provided to receive a DC pulsed power input which includes the following:

1) DC pulsed power; or
2) The DC pulsed power with constant or variable voltage and constant or variable periods converted from DC power source; or
3) The DC pulsed power with constant or variable voltage and constant or variable periods converted from DC power which is further rectified from AC power; or
4) The half-wave or full-wave DC pulsed power rectified from AC power with constant or variable voltage and constant or variable frequency.

The DC pulsed power input is divided by the first impedance and the second impedance of parallel resonance in series connection, whereof the divided power is rectified by a rectifier device to an uni-directional DC power to drive the uni-directional conducting light emitting diode, whereof it is characterized in that when a high frequency pulsed power is used in the uni-directional light emitting diode drive circuit in pulsed power parallel resonance, its volume and weight can be effectively reduced as well as that the cost can be lowered.

DESCRIPTION OF MAIN COMPONENT SYMBOLS

BR101: Rectifier device
C100, C200: Capacitor
CR201: Diode
ESD101: Charge/discharge device
I103, I200: Inductive impedance component
IT200: Separating type transformer
L100: Uni-directional conducting light emitting diode set
LED101: Light emitting diode
R101: Discharge resistor
R103: Current limit resistor
ST200: Self-coupled transformer U100: Uni-directional light emitting diode (LED) drive circuit
W0: Self-coupled voltage change winding
W1: Primary side winding
W2: Secondary side winding
Z101: First impedance
Z102: Second impedance
ZD101: Zener diode
300: Bi-directional power modulator of series connection type
330: DC power modulator of series connection type
400: Bi-directional power modulator of parallel connection type
430: DC power modulator of parallel connection type
500: Impedance component
600: Switching device
5000: DC to DC Converter

DETAILED DESCRIPTION OF THE PREFERRED EMBODIMENTS

The unidirectional light emitting diode drive circuit in pulsed power parallel resonance of the present invention, whereof at least one capacitive impedance component, or inductive impedance component or resistive impedance component constitute the first impedance, while the second impedance is constituted by at least one capacitive impedance component and at least one inductive impedance component in parallel connection, whereof in a pulsed power input, their inherent parallel resonance frequency after the parallel connection is the same as the pulse period of the pulsed power to appear parallel resonance status.

The two ends of the first impedance and the second impedance in series connection are provided to receive a pulsed power input from power source, whereby the pulsed power from power source forms the divided power at the second impedance in parallel resonance, and the said corresponding divided power of the second impedance in parallel resonance is provided to the AC input ends of a rectifier device, and through DC output ends of the said rectifier device to provide DC power output;

The unidirectional conducting light emitting diode set constituted by at least one light emitting diode is arranged to be driven by the DC power outputted from the rectifier device.

The AC input ends of at least one rectifier device are arranged to receive the divided power from the two ends of the first impedance, or to receive the divided power from the second impedance;

The rectified DC power is arranged to drive at least one uni-directional conducting light emitting diode set, whereby to constitute the uni-directional light emitting diode drive circuit in pulsed power parallel resonance of the present invention.

Figure 1:
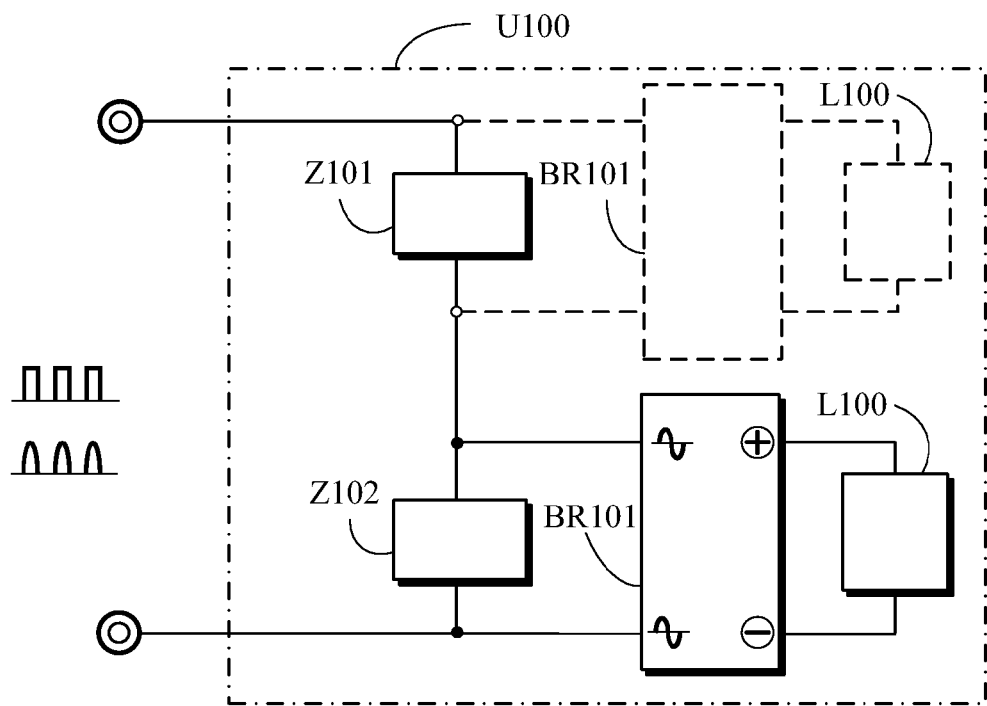
FIG. 1 is the schematic block diagram of the unidirectional light emitting diode drive circuit in pulsed power parallel resonance.

FIG. 1 is the schematic block diagram of the uni-directional light emitting diode drive circuit in pulsed power parallel resonance, in which the circuit function is operated through the uni-directional light emitting diode drive circuit (U100) as shown in FIG. 1, whereof it is comprised of that:

A first impedance (Z101) includes:
(1) A first impedance (Z101) is constituted of capacitive impedance components, or inductive impedance components or resistive impedance components, whereof it can be optionally installed as needed one kind or more than one kind and one or more than one impedance components, or can be optionally installed as needed by two or more than two kinds of impedance components, whereof each kind of impedance components can be respectively to be one or more than one in series connection, or parallel connection, or series and parallel connection; or (2) The first impedance (Z101) is constituted by the at least one capacitive impedance component and at least one inductive impedance component in series connection, whereof the inherent series resonance frequency of the two after series connection is the same as the period of a DC power of periodically alternated polarity, thereby to appear series resonance status; or (3) The first impedance (Z101) is constituted by at least one capacitive impedance component and at least one inductive impedance component in parallel connection, whereof the inherent parallel resonance frequency of the two after parallel connection is the same as the period of a DC power of periodically alternated polarity, thereby to appear series resonance status;

A second impedance (Z102) is constituted by at least one inductive impedance component and at least one capacitor (C200) in parallel connection, whereof their inherent parallel resonance frequency after parallel connection is the same as the pulse period of the pulsed power to appear a low consumption power storage status and an end voltage status in alternated polarities of corresponding parallel resonance frequency;

The said unidirectional light emitting diode drive circuit in pulsed power parallel resonance can be optionally installed with capacitive, inductive or resistive impedance components as needed, whereof the first impedance (Z101) is constituted by at least one of said three types of impedance components;

The unidirectional light emitting diode drive circuit in pulsed power parallel resonance, whereof the first impedance (Z101) can be selected not to be installed while the second impedance (Z102) is directly parallel connected with the pulsed power source to appear parallel resonance;

A rectifier device (BR101): It is parallel connected across the two ends of the first impedance (Z101) or the second impedance (Z102), or parallel connected across the two ends of the first impedance (Z101) and the two ends of the second impedance (Z102) simultaneously, whereof the divided power across the two ends of the first impedance (Z101) or the second impedance (Z102) is rectified to a DC power, whereby to drive the uni-directional conducting light emitting diode set (L100);

The rectifier device can be constituted by a bridge type rectifier device or by a half-wave rectifier device, whereof the number of rectifier device (BR101) can be one or more than one;

An uni-directional conducting light emitting diode set (L100): The uni-directional conducting light emitting diode set (L100) is constituted by a forward current polarity light emitting diode, or two or more than two forward current polarity light emitting diodes in series connection or parallel connection, or three or more than three forward current polarity light emitting diodes in series connection, parallel connection or series and parallel connection.

The uni-directional conducting light emitting diode set (L100) can be selected to be installed one set or more than one set as needed, whereof it is arranged to be driven by DC power outputted from the rectifier device (BR101).

Figure 2:
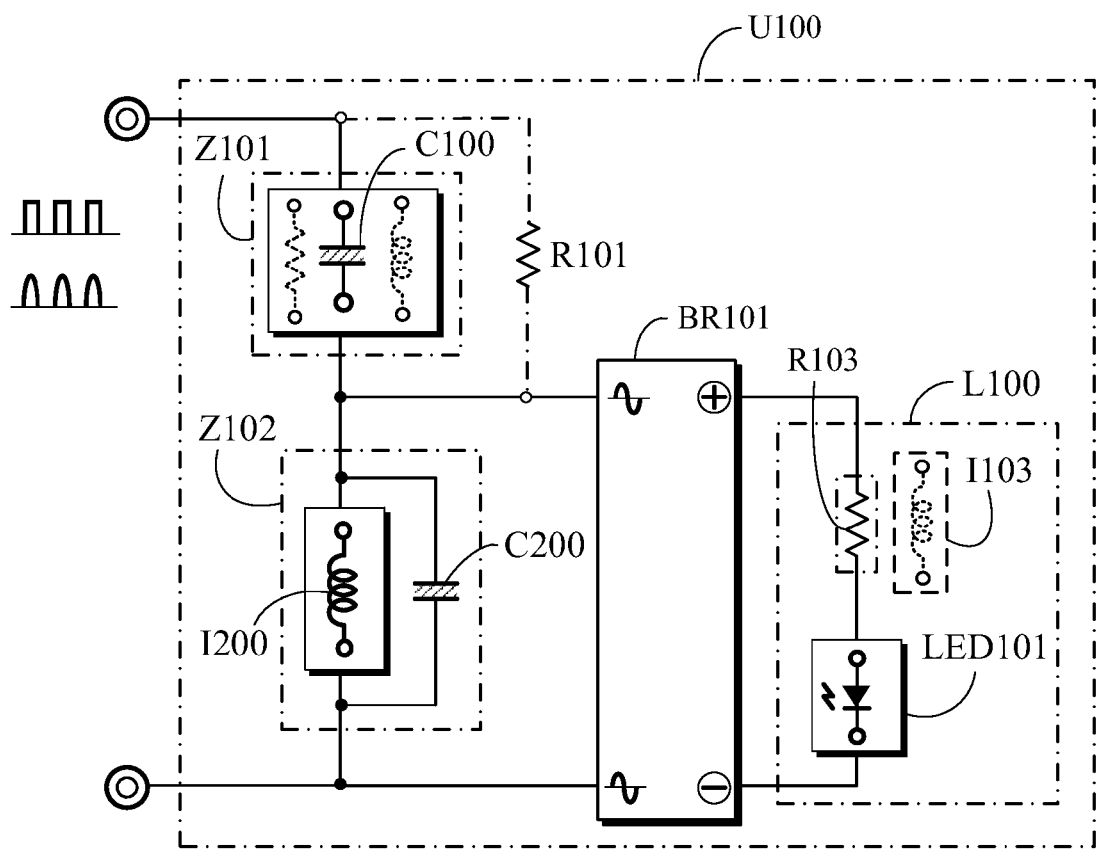
FIG. 2 is the circuit example schematic diagram of the present invention.

For convenience of description, the components listed in the circuit examples of the following exemplary embodiments are selected as in the following:

1) A first impedance (Z101), a second impedance (Z102), a rectifier device (BR101) and an unidirectional conducting light emitting diode set (L100) are installed in the embodied examples. Nonetheless, the selected quantities are not limited in actual applications;

2) The capacitive impedance of the capacitor (C100) is used to represent the first impedance, whereby to constitute the first impedance (Z101) and the capacitor (C200) and the inductive impedance component (I200) are in parallel connection, whereof their inherent parallel resonance frequency is the same as the pulse period of the pulsed power from the power source to appear parallel resonance status, whereby to constitute the second impedance (Z102). In actual applications, the first impedance component can be optionally installed as needed to be constituted by various capacitive impedance components, inductive impedance components or resistive impedance components in series connection, parallel connection or series and parallel connections, whereof it is described in the following:

FIG. 2 is a circuit example schematic diagram of the present invention which is mainly comprised of:

A first impedance (Z101): it is constituted by at least one capacitor (C100) with especially referring to a bipolar capacitor, whereof the quantity of the first impedance is one or more than ones, or the first impedance (Z101) can be optionally selected not to use as needed;

A second impedance (Z102): It is constituted by at least one capacitor (C200) and at least one inductive impedance component (I200) in parallel connection with specially referring to the constitution by inductive impedance component and bipolar capacitor, whereof its frequency is the same as the pulse period of the pulsed power to appear parallel resonance status; the quantity of the second impedance is one or more than ones;

At least one first impedance (Z101) and at least one second impedance (Z102) are in series connection, whereof the two ends of the two after series connection are provided with a pulsed power input, whereby the divided power formed across the two ends of the second impedance (Z102) in parallel resonance is provided to the AC input ends of the rectifier device (BR101), whereby the rectified power is used to drive at least one uni-directional conducting light emitting diode set (L100);

A rectifier device (BR101): at least one rectifier device (BR101) is installed to receive the divided power from the two ends of the first impedance (Z101) or the second impedance (Z102), or two or more than two rectifier devices (BR101) are installed to respectively receive the divided power from the two ends of the first impedance (Z101) or the second impedance (Z102) thereby the divided power across the two ends of the first impedance (Z101) or the second impedance (Z102) is rectified to DC power to drive the uni-directional conducting light emitting diode set (L100);

The rectifier device can be constituted by a bridge type rectifier device or by a half-wave rectifier device, whereof the number of rectifier device (BR101) can be one or more than one;

An uni-directional conducting light emitting diode set (L100): The uni-directional conducting light emitting diode set (L100) is constituted by a forward current polarity light emitting diode (LED101), or two or more than two forward current polarity light emitting diodes (LED101) in series connection or parallel connection, or three or more than three forward current polarity light emitting diodes (LED101) in series connection, parallel connection, or series and parallel connection, whereof one or more than one uni-directional conducting light emitting diode set (L100) can be optionally installed as needed to be driven by the DC power outputted from the rectifier device (BR101);

The AC input ends of the rectifier device (BR101) is provided to receive the corresponding divided power in parallel resonance across the two ends of the second impedance (Z102) to drive the uni-directional conducting light emitting diode set (L100), whereby to limit its current by the first impedance (Z101), whereof if the capacitor (C100) is selected to constitute the first impedance (Z101), its capacity impedance is used to limit the output current;

A discharge resistor (R101): It is an optionally installed component, whereof when the capacitor (C100) is selected to constitute the first impedance (Z101), it is parallel connected across the two ends of the capacitor (C100) to release the residual charge of capacitor (C100);

A current limit resistor (R103): It is an optionally installed component to be individually series connected with each of light emitting diodes (LED101) which constitute the unidirectional conducting light emitting diode set (L100), whereby to limit the current passing through the light emitting diode (LED101); whereof the current limit resistor (R103) can also be replaced by an inductive impedance component (I103);

Thereby, based on said circuit structure by connecting the first impedance (Z101), the second impedance (Z102), the rectifier device (BR101) and the uni-directional conducting light emitting diode set (L100) to constitute the uni-directional light emitting diode drive circuit (U100);

In addition, the unidirectional conducting light emitting diode set (L100) in the uni-directional light emitting diode drive circuit (U100) of the uni-directional light emitting diode drive circuit in pulsed power parallel resonance of the present invention is through the divided power distribution effect by the parallel connection between the rectifier device (BR101) and the second impedance (Z102) to reduce the voltage variation rate across the two ends of unidirectional conducting light emitting diode set (L100) corresponding to the power source of voltage variation.

Figure 3:
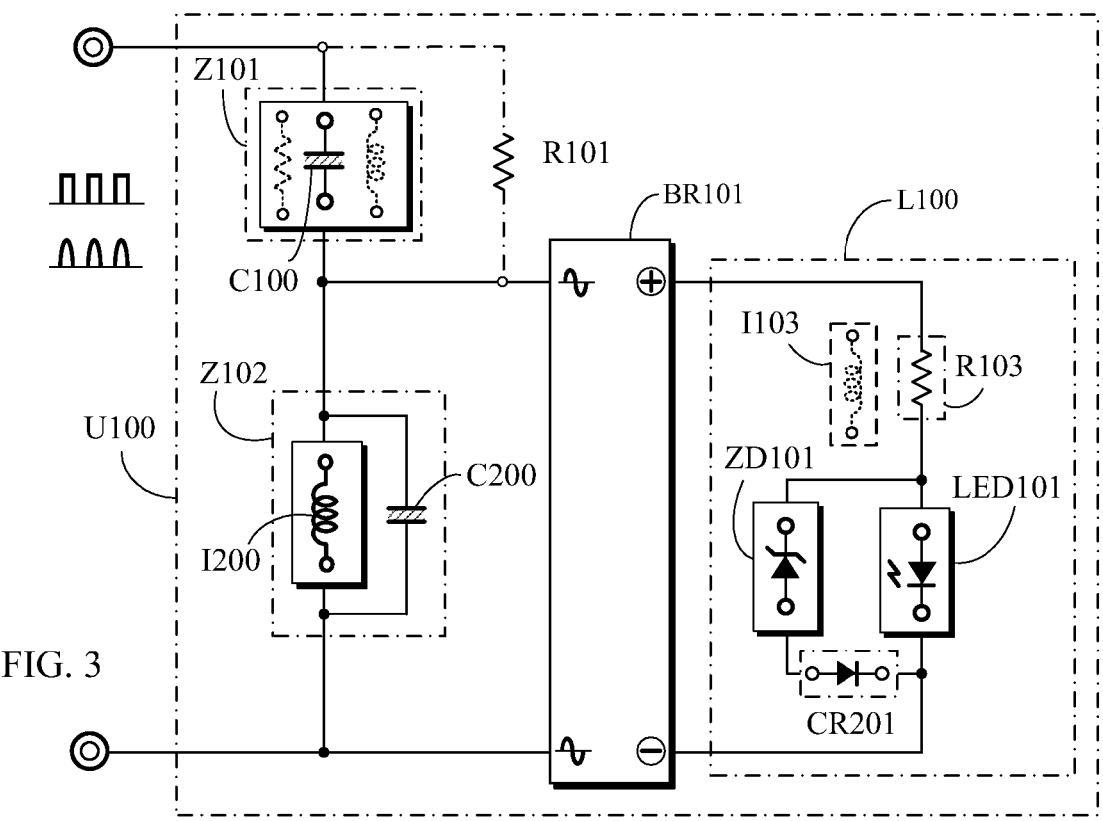
FIG. 3 is a circuit example schematic diagram illustrating that the unidirectional conducting light emitting diode set in the circuit of FIG. 2 is further installed with a zener diode.
Figure 4:
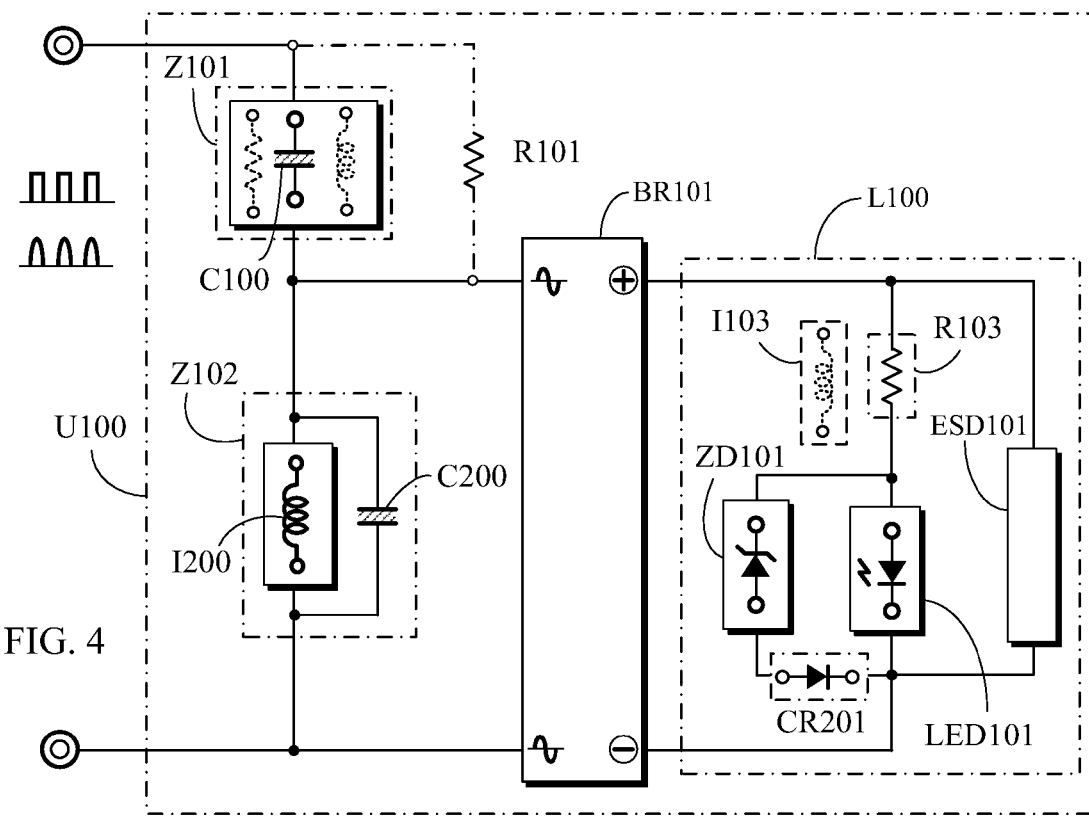
FIG. 4 is a circuit example schematic diagram illustrating that a charge/discharge device is parallel connected across the two ends of the light emitting diode and the current limit resistor in series connection in the circuit of FIG. 3.

The light emitting diode (LED101) which constitutes the uni-directional conducting light emitting diode set (L100) in the uni-directional light emitting diode drive circuit (U100) of the uni-directional light emitting diode drive circuit in pulsed power parallel resonance includes the following selections:

The uni-directional conducting light emitting diode set (L100) is constituted by a forward current polarity light emitting diode, or two or more than two forward current polarity light emitting diodes in series connection or parallel connection, or three or more than three forward current polarity light emitting diodes in series connection, parallel connection, or series and parallel connection, whereof one or more than one uni-directional conducting light emitting diode set (L100) can be optionally selected as needed;

In addition, to protect the light emitting diode and to avoid the light emitting diode (LED101) being damaged or reduced working life by abnormal voltage, a zener diode can be further parallel connected across the two ends of the light emitting diode (LED101) of the uni-directional conducting light emitting diode set (L100) in the uni-directional light emitting diode drive circuit (U100) of the uni-directional light emitting diode drive circuit in pulsed power parallel resonance, or the zener diode can be first series connected with at least one diode to jointly produce the function of zener voltage effect, then to be parallel connected across the two ends of the light emitting diode (LED101);

FIG. 3 is a circuit example schematic diagram illustrating that the uni-directional conducting light emitting diode set in the circuit of FIG. 2 is further installed with a zener diode, whereof it is constituted by the following:

A zener diode (ZD101) is parallel connected across the two ends of the light emitting diode (LED101) of the unidirectional conducting light emitting diode set (L100) in the unidirectional light emitting diode drive circuit (U100), whereof their polarity relationship is that the zener voltage of the zener diode (ZD101) is used to limit the working voltage across the two ends of the light emitting diode (LED101);

A zener diode (ZD101) is parallel connected across the two ends of the light emitting diode (LED101) of the unidirectional conducting light emitting diode set (L100) in the unidirectional light emitting diode drive circuit (U100), whereof the said zener diode (ZD101) can be optionally series connected with a diode (CR201) as needed to produce the zener voltage effect together, whereby the advantages are 1) the zener diode (ZD101) can be protected from abnormal reverse voltage; 2) both diode (CR201) and zener diode (ZD101) have temperature compensation effect;

To promote the lighting stability of the light source produced by the light emitting diode in the unidirectional light emitting diode drive circuit (U100) of the unidirectional light emitting diode drive circuit in pulsed power parallel resonance, the light emitting diode (LED101) can be further installed with a charge/discharge device (ESD101), whereof random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously;

As shown in FIG. 4, which is a circuit example schematic diagram illustrating that a charge/discharge device is parallel connected across the two ends of the light emitting diode and the current limit resistor in series connection in the circuit of FIG. 3.

Figure 5:
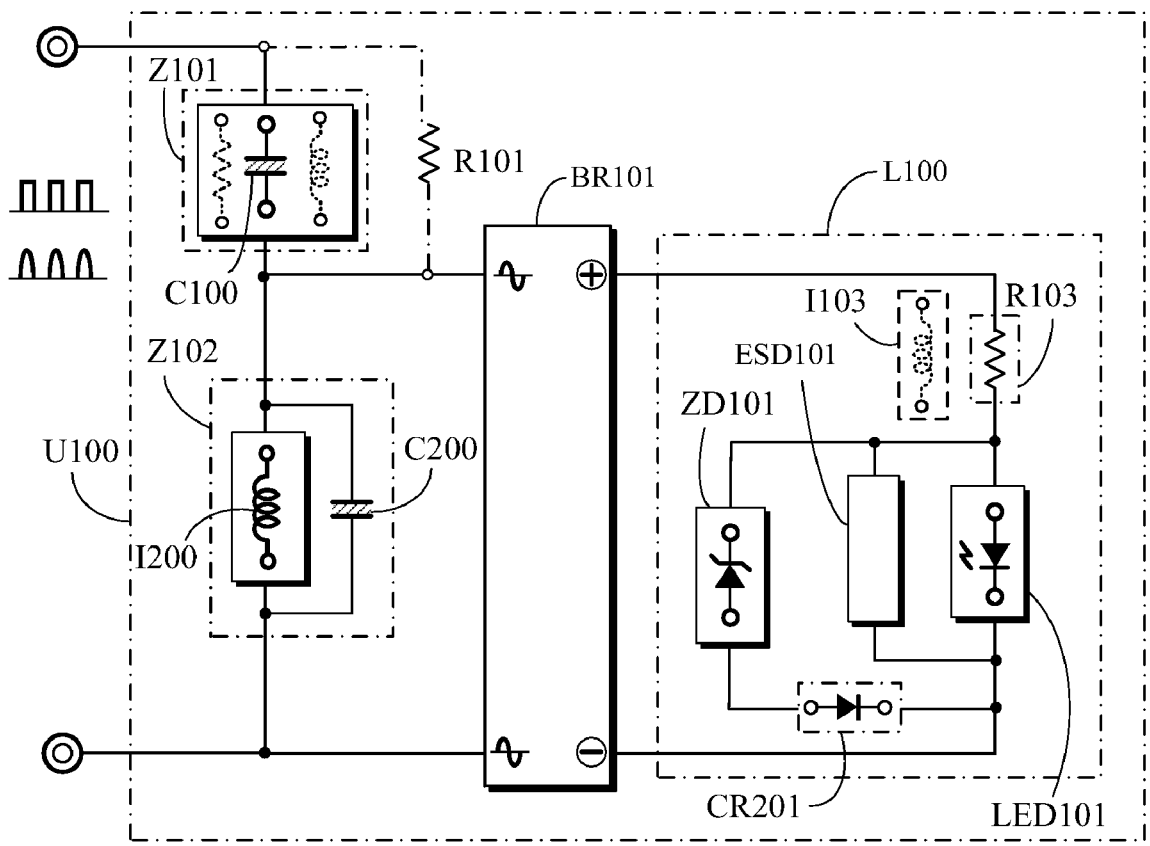
FIG. 5 is a circuit example schematic diagram illustrating that a charge/discharge device is parallel connected across the two ends of the light emitting diode in the circuit of FIG. 3.

As shown in FIG. 5, which is a circuit example schematic diagram illustrating that a charge/discharge device is parallel connected across the two ends of the light emitting diode in the circuit of FIG. 3.

FIG. 4 and FIG. 5 are comprised of that:

The uni-directional conducting light emitting diode set (L100) can be further installed with a charge/discharge device (ESD101) including to be parallel connected across the two ends of the light emitting diode (LED101) and the current limit resistor (R103) in series connection as shown in FIG. 4, or across the two ends of the light emitting diode (LED101) as shown in FIG. 5 according to polarities, whereof random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously;

The aforesaid charge/discharge device (ESD101) can be constituted by the conventional charging and discharging batteries, or super-capacitors or capacitors, etc.

Figure 6:
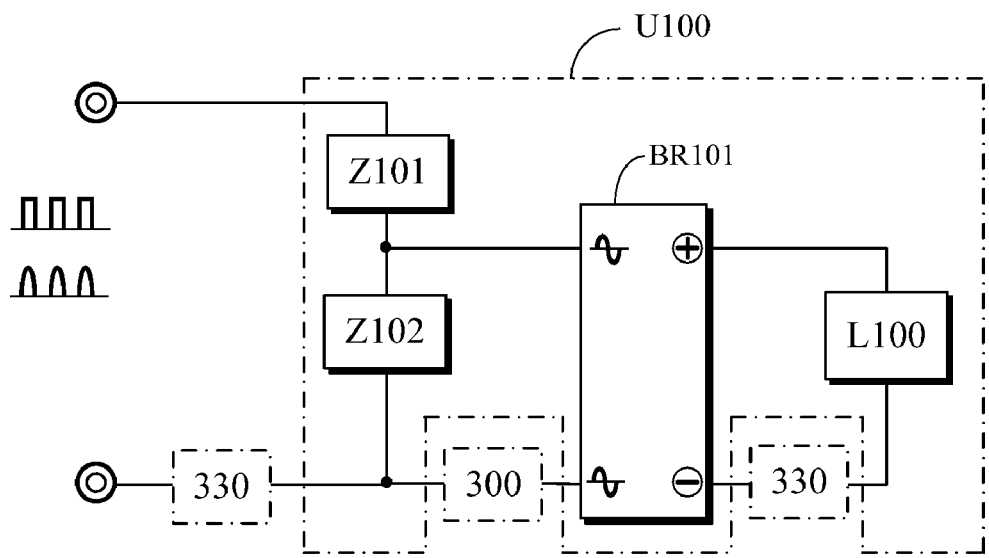
FIG. 6 is a circuit example schematic block diagram of the present invention which is series connected to a power modulator of series connection type.
Figure 7:
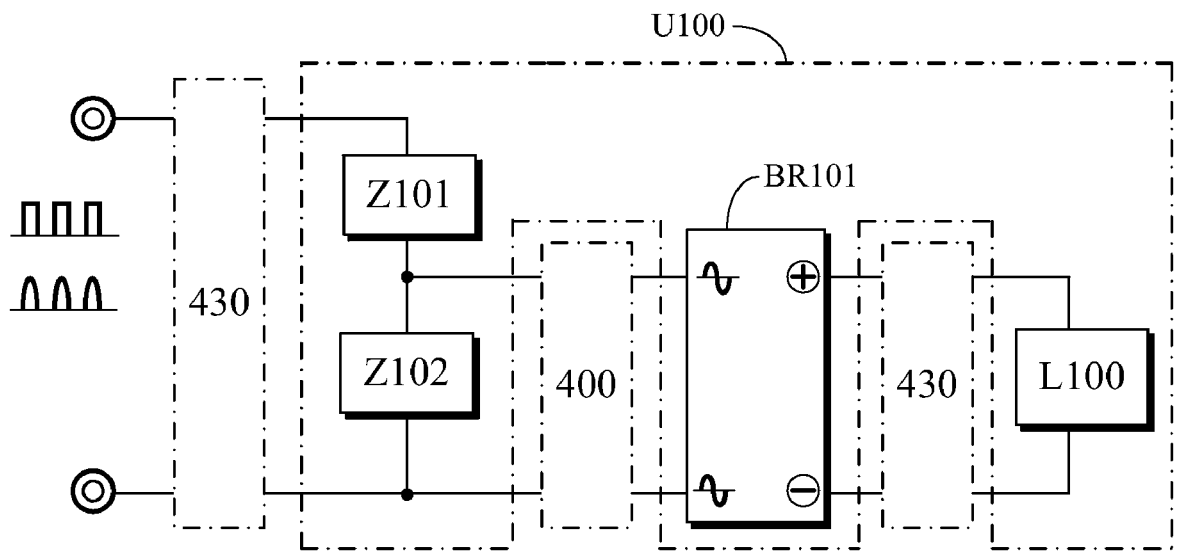
FIG. 7 is a circuit example schematic block diagram of the present invention which is parallel connected to a power modulator of parallel connection type.
Figure 8:
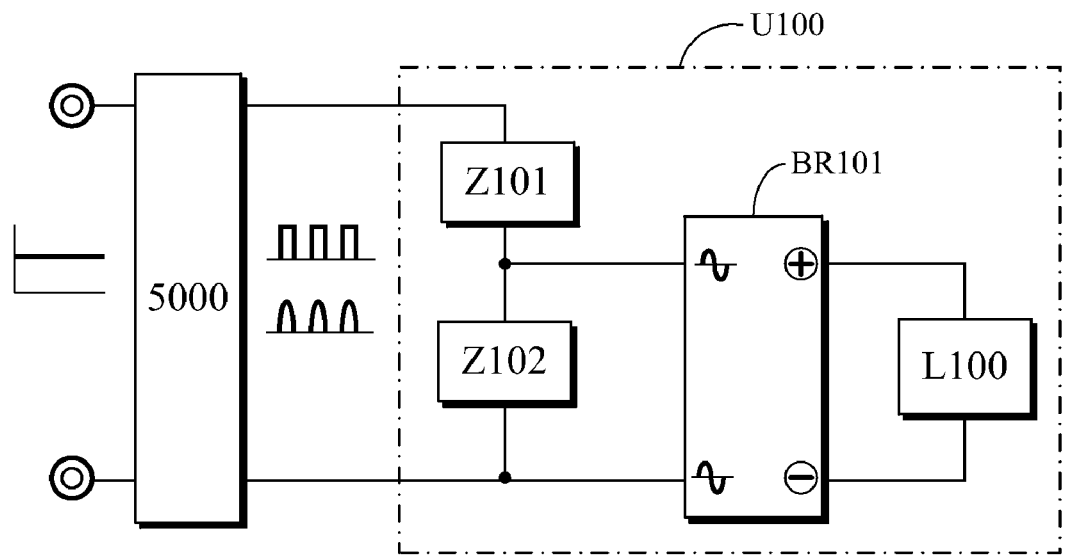
FIG. 8 is a circuit example schematic block diagram of the present invention driven by the DC to DC converter output power.
Figure 9:
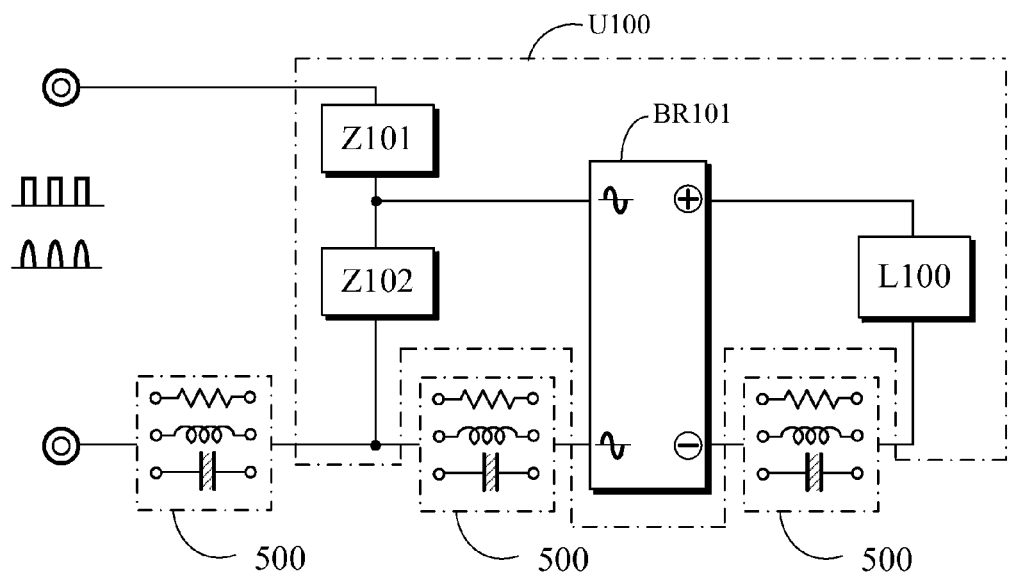
FIG. 9 is a circuit example schematic block diagram of the present invention which is series connected with impedance components.
Figure 10:
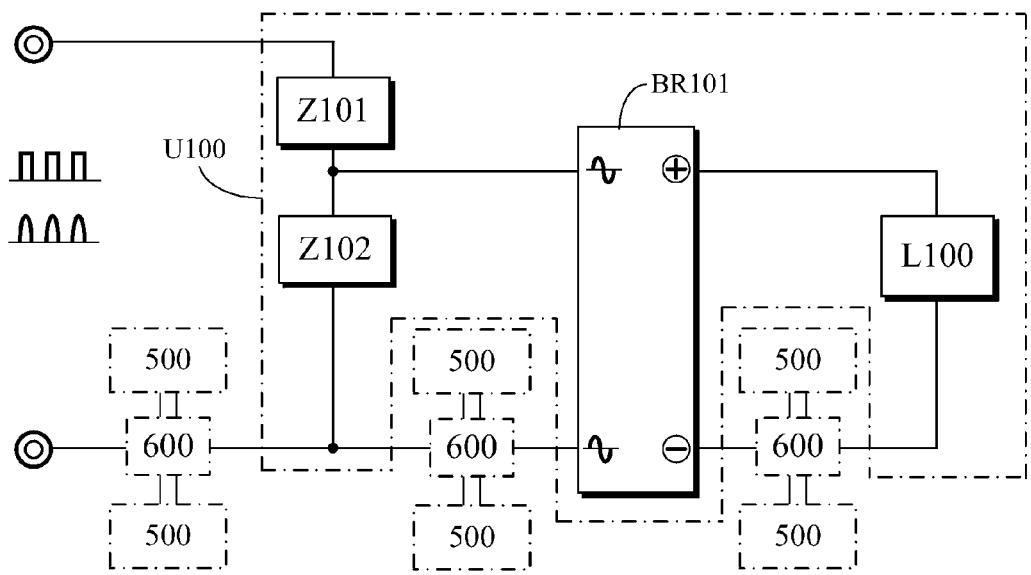
FIG. 10 is a circuit example schematic block diagram of the present invention illustrating that the impedance components in series connection execute series connection, or parallel connection, or series and parallel connection by means of the switching device.

The first impedance (Z101), the second impedance (Z102), the rectifier device (BR101) and the unidirectional conducting light emitting diode set (L100) as well as the light emitting diode (LED101) and various aforesaid optional auxiliary circuit components shown in the circuit examples of FIGS. 1-5 are based on application needs, whereof they can be optionally installed or not installed as needed and the installation quantity include constitution by one, wherein if more than one are selected, the corresponding polarity relationship shall be determined based on circuit function requirement to execute series connection, or parallel connection, or series and parallel connections; thereof it is constituted as the following:

1. The first impedance (Z101) can be constituted by one or by more than one in series connection or parallel connection or series and parallel connection, whereof in multiple installations, each first impedance can be constituted by the same kind of capacitors (C100), inductive impedance components, or resistive impedance components, or other different kinds of impedance components, in which their impedance values can be the same or different;

2. The second impedance (Z102) can be constituted by a capacitor (C200) and an inductive impedance component (I200) in parallel connection, whereof it has the same pulse period as that of the pulsed power, whereby to appear parallel resonance status, whereof the second impedance (Z102) can be constituted by one or by more than one in series connection, parallel connection, or series and parallel connection, whereof in multiple installations, each second impedance can be of the same or different types of capacitive impedance components, or inductive impedance components in parallel connection and have the same pulse period as that of the pulsed power, whereby to appear parallel resonance, whereof their impedance value can be the same or different, but the periods of their parallel resonances are the same;

3. The light emitting diode (LED101) can be constituted by one, or by more than one light emitting diode in series connection of forward polarity, or in parallel connection of the same polarity, or in series and parallel connection;

4. In the uni-directional light emitting diode drive circuit (U100):

(1) An uni-directional conducting light emitting diode set (L100) or more than one uni-directional conducting light emitting diode sets (L100) in series connection, parallel connection, or series and parallel connection can be optionally installed as needed in the uni-directional conducting light emitting diode set (L100), whereof if one or more than one sets is installed, it can be driven by the divided power of a common impedance (Z102) through its matched rectifier device (BR101), or it can be individually driven by the divided power of multiple second impedances (Z102) in series or parallel connection, whereof each of the multiple second impedances (Z102) is installed with a rectifier device (BR101) individually to drive its corresponding matched uni-directional conducting light emitting diode set (L100) individually;

(2) If a charge/discharge device (ESD101) is installed in the uni-directional light emitting diode drive circuit (U100), the light emitting diode (LED101) of the unidirectional conducting light emitting diode set (L100) is driven by continuous DC power to emit light;

(3) If the charge/discharge device (ESD101) is not installed, current conduction to light emitting diode (LED101) is intermittent, whereby referring to the input voltage wave shape and duty cycle of current conduction, the light emitting forward current and the peak of light emitting forward voltage of each light emitting diode in the uni-directional conducting light emitting diode set (L100) can be correspondingly selected for the light emitting diode (LED101), whereof the selections include the following:

1) The light emitting peak of forward voltage is lower than the rated forward voltage of light emitting diode (LED101); or 2) The rated forward voltage of light emitting diode (LED101) is selected to be the light emitting peak of forward voltage; or 3) If current conduction to light emitting diode (LED101) is intermittent, the peak of light emitting forward voltage can be correspondingly selected based on the duty cycle of current conduction as long as the principle of that the peak of light emitting forward voltage does not damage the light emitting diode (LED101) is followed;

Based on the value and wave shape of the aforesaid light emitting forward voltage, the corresponding current value and wave shape from the forward voltage vs. forward current ratio are produced; however the peak of light emitting forward current shall follow the principle not to damage the light emitting diode (LED101);

The luminosity or the stepped or step-less luminosity modulation of the forward current vs. relative luminosity can be controlled based on the aforesaid value and wave shape of forward current;

5. The discharge resistor (R101) can be constituted by one resistor, or by more than one resistors in series connection or parallel connection or series and parallel connection, whereof the said devices can be optionally installed as needed;

6. The current limit resistor (R103) can be constituted by one resistor, or by more than one resistors in series connection or parallel connection or series and parallel connection, whereof the said devices can be optionally installed as needed;

7. The inductive impedance component (I103) can be constituted by one impedance component, or by more than one impedance components in series connection or parallel connection or series and parallel connection, whereof the said devices can be optionally installed as needed;

8. The zener diode (ZD101) can be constituted by one zener diode, or by more than one zener diodes in series connection or parallel connection or series and parallel connection, whereof the said devices can be optionally installed as needed;

9. The diode (CR201) can be constituted by one diode, or by more than one diodes in series connection or parallel connection or series and parallel connection, whereof the said devices can be optionally installed as needed;

10. The charge/discharge device (ESD101) can be constituted by one, or by more than one in series connection or parallel connection or series and parallel connection, whereof the said devices can be optionally installed as needed;

In the application of the uni-directional light emitting diode drive circuit (U100) of the uni-directional light emitting diode drive circuit in pulsed power parallel resonance, the following different types of DC power can be provided for inputs, whereof the pulsed power includes that:

1) DC pulsed power; or
2) The DC pulsed power with constant or variable voltage and constant or variable periods converted from DC power source; or
3) The DC pulsed power with constant or variable voltage and constant or variable periods converted from DC power which is further rectified from AC power; or
4) The half-wave or full-wave DC pulsed power rectified from AC power with constant or variable voltage and constant or variable frequency;

In addition, the following active modulating circuit devices can be further optionally combined as needed, whereof various applied circuits are as following:

1. FIG. 6 is a circuit example schematic block diagram of the present invention which is series connected to the power modulator of series connection type, whereof the power modulator of series connection type is constituted by the following:

A DC power modulator of series connection type (330): It is constituted by the conventional electromechanical components or solid state power components and related electronic circuit components to modulate the DC pulsed power output;

A bi-directional power modulator of series connection type (300): It is constituted by the conventional electromechanical components or solid state power components and related electronic circuit components to modulate the bi-directional power output;

The circuit operating functions are the following:

1) The DC power modulator of series connection type (330) can be optionally installed as needed to be series connected with the uni-directional light emitting diode drive circuit (U100) to receive the DC pulsed power from power source, whereby the DC pulsed power is modulated by the DC power modulator of series connection type (330) to execute power modulations such as pulse width modulation or current conduction phase angle control, or impedance modulation, etc. to drive the uni-directional light emitting diode drive circuit (U100); or 2) The bi-directional power modulator of series connection type (300) can be optionally installed as needed to be series connected between the second impedance (Z102) and the AC input ends of the rectifier device (BR101) whereby the bi-directional AC divided power in parallel resonance from the two ends of the second impedance (Z102) is modulated by the bi-directional power modulator of series connection type (300) to execute power modulations such as pulse width modulation or current conduction phase angle control, or impedance modulation, etc. to drive the uni-directional conducting light emitting diode set (L100) through the rectifier device (BR101); or 3) The DC power modulator of series connection type (330) can be optionally installed as needed to be series connected between the DC output ends of the rectifier device (BR101) and the uni-directional conducting light emitting diode set (L100), whereby DC power from the rectifier device (BR101) is modulated by the DC power modulator of series connection type (330) to execute power modulations such as pulse width modulation or current conduction phase angle control, or impedance modulation, etc. to drive the unidirectional conducting light emitting diode set (L100);

2. FIG. 7 is a circuit example schematic block diagram of the present invention which is parallel connected to a power modulator of parallel connection type, whereof the power modulator of parallel connection type is constituted by the following:

A DC power modulator of parallel connection type (430): It is constituted by the conventional electromechanical components or solid state power components and related electronic circuit components to modulate the output power of DC pulsed power;

A bi-directional power modulator of parallel connection type (400): It is constituted by the conventional electromechanical components or solid state power components and related electronic circuit components to modulate the output power of the bi-directional power;

The circuit operating functions are as following:

(1) The DC power modulator of parallel connection type (430) can be optionally installed as needed, whereof its output ends are for parallel connection with the unidirectional light emitting diode drive circuit (U100), while its input ends are provided for receiving the DC pulsed power from the power source, whereby the DC pulsed power is modulated by the DC power modulator of parallel connection type (430) to execute power modulations such as pulse width modulation or current conduction phase angle control, or impedance modulation, etc. to drive the uni-directional light emitting diode drive circuit (U100); or (2) The bi-directional power modulator of parallel connection type (400) can be optionally installed as needed, whereof its output ends are parallel connected with the AC input ends of the rectifier device (BR101) while its input ends are parallel connected with the second impedance (Z102), whereby the bi-directional AC divided power in parallel resonance from the two ends of the second impedance (Z102) is modulated by the bi-directional power modulator of parallel connection type (400) to execute power modulations such as pulse width modulation or current conduction phase angle control, or impedance modulation, etc. whereby to be rectified to DC power by the rectifier device (BR101) so as to drive the uni-directional conducting light emitting diode set (L100); or (3) The DC power modulator of parallel connection type (430) can be optionally installed as needed, whereof its output ends are parallel connected with the unidirectional conducting light emitting diode set (L100), while its input ends are parallel connected with the DC output ends of the rectifier device (BR101), whereby the DC power from the rectifier device (BR101) is modulated by the DC power modulator of parallel connection type (430) to execute power modulations such as pulse width modulation or current conduction phase angle control, or impedance modulation, etc. to drive the unidirectional conducting light emitting diode set (L100);

3. FIG. 8 is a circuit example schematic block diagram of the present invention to be driven by the power outputted from a DC to DC converter;

It is mainly comprised of that:

A DC to DC converter (5000): It is constituted by conventional electromechanical components or solid state power components and related electronic circuit components, whereof its input ends receive DC power while its output ends provide output which can be optionally selected as needed to be a DC pulsed power with constant or variable voltage and constant or variable periods;

The circuit operating functions are as following:

A DC to DC converter (5000), in which its input ends receive DC power while its output ends provide DC pulsed power, wherein the uni-directional light emitting diode drive circuit (U100) is parallel connected with the output ends of the DC to DC converter (5000); whereof the input ends of the DC to DC converter are arranged to receive the optionally selected DC power with constant or variable voltage, or the DC power rectified from AC power;

The output provided by the output ends of the DC to DC converter (5000) can be optionally selected as needed to be a DC pulsed power with constant or variable voltage and constant or variable periods to control and drive the uni-directional light emitting diode drive circuit (U100);

In addition, the unidirectional light emitting diode drive circuit (U100) can be controlled and driven by modulating the output power from the DC to DC converter (5000), or by executing power modulation such as pulse width modulation or current conduction phase angle control, or impedance modulation, etc to the power outputted;

4. The uni-directional light emitting diode drive circuit (U100) is arranged to be series connected with at least one conventional impedance component (500) and further to be parallel connected with the power source, whereof the impedance (500) includes that:

1) An impedance component (500): it is constituted by a component with capacitive impedance characteristics; or
2) An impedance component (500): it is constituted by a component with inductive impedance characteristics; or
3) An impedance component (500): it is constituted by a component with resistive impedance characteristics; or
4) An impedance component (500): it is constituted by a single impedance component with the combined impedance characteristics of at least two of the resistive impedance, or inductive impedance, or capacitive impedance simultaneously, thereby to provide DC or AC impedances; or
5) An impedance component (500): it is constituted by a single impedance component with the combined impedance characteristics of capacitive impedance and inductive impedance, whereof its inherent resonance frequency is the same as the frequency or period of bi-directional or unidirectional pulsed power, thereby to produce a parallel resonance status; or
6) An impedance component (500): it is constituted by capacitive impedance components, or inductive impedance components, or resistive impedance components, including one or more than one kind of one and more than one impedance component, or two or more than two kinds of impedance components in series connection, or parallel connection, or series and parallel connections, thereby to provide a DC or AC impedance; or
7) An impedance component (500): it is constituted by the mutual series connection of a capacitive impedance component and an inductive impedance component, whereof its inherent series resonance frequency is the same as the frequency or period of bidirectional or unidirectional pulsed power, thereby to produce a series resonance status and the end voltage across two ends of the capacitive impedance component or the inductive impedance component appear in series resonance correspondingly;

Or the capacitive impedance and the inductive impedance are in mutual parallel connection, whereby its inherent parallel resonance frequency is the same as the frequency or period of bidirectional or uni-directional pulsed power, thereby to produce a parallel resonance status and appear the corresponding end voltage;

FIG. 9 is a circuit example schematic block diagram of the present invention which is series connected with impedance components;

5. At least two impedance components (500) as said in the item 4 execute switches between series connection, parallel connection and series and parallel connection bye means of the switching device (600) which is constituted by electromechanical components or solid state components, whereby to modulate the power transmitted to the uni-directional light emitting diode drive circuit (U100), wherein FIG. 10 is a circuit example schematic block diagram of the present invention illustrating that the impedance components in series connection execute series connection, or parallel connection, or series and parallel connection by means of the switching device.

Figure 11:
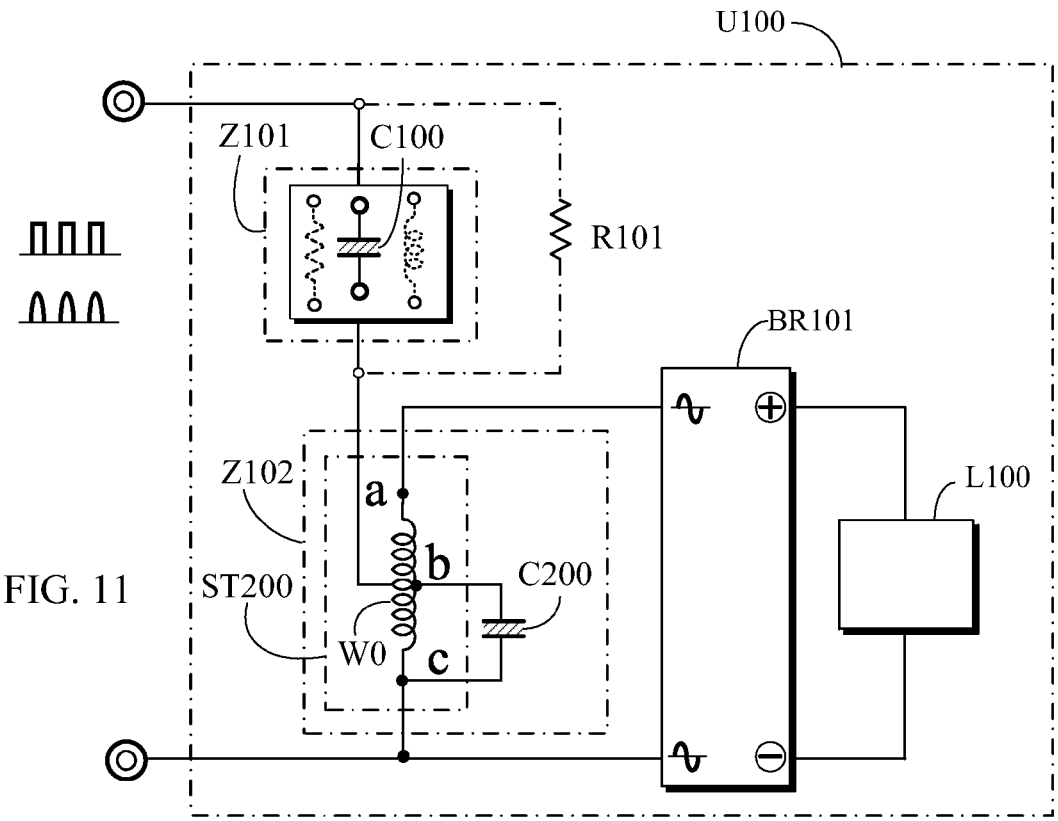
FIG. 11 is a circuit example schematic diagram of the present invention illustrating that the inductive impedance component of the second impedance is replaced by the self-coupled voltage change power supply side winding of the self-coupled transformer thereby to constitute a voltage rise.
Figure 12:
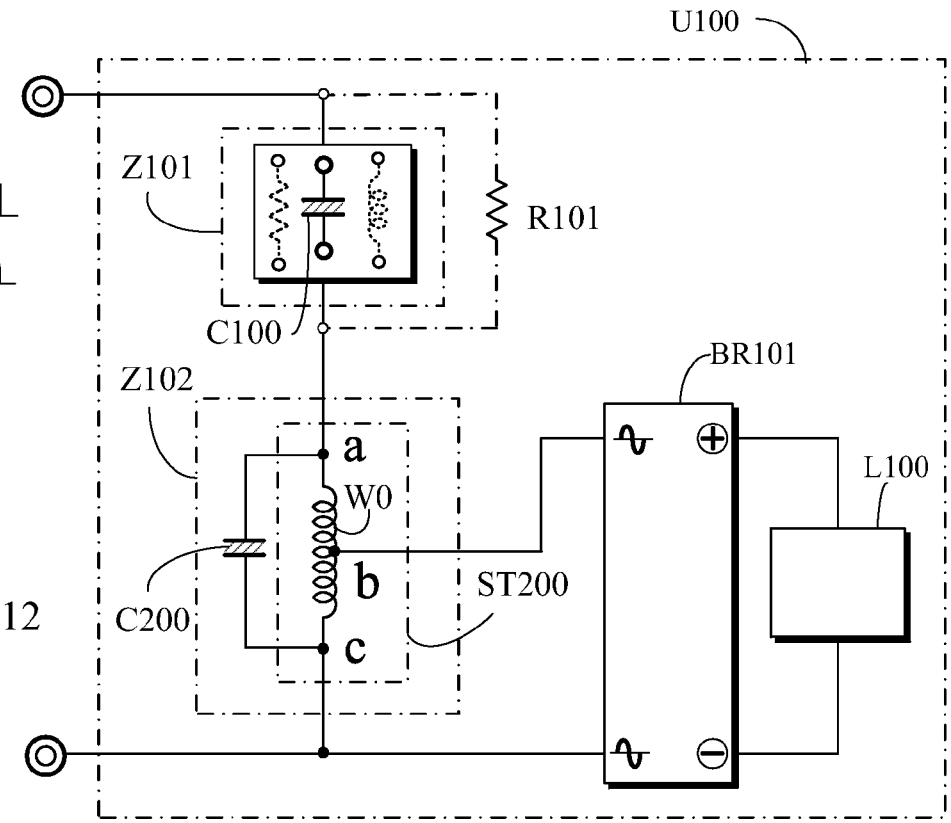
FIG. 12 is a circuit example schematic diagram of the present invention illustrating that the inductive impedance component of the second impedance is replaced by the self-coupled voltage change power supply side winding of the self-coupled transformer thereby to constitute a voltage drop.
Figure 13:
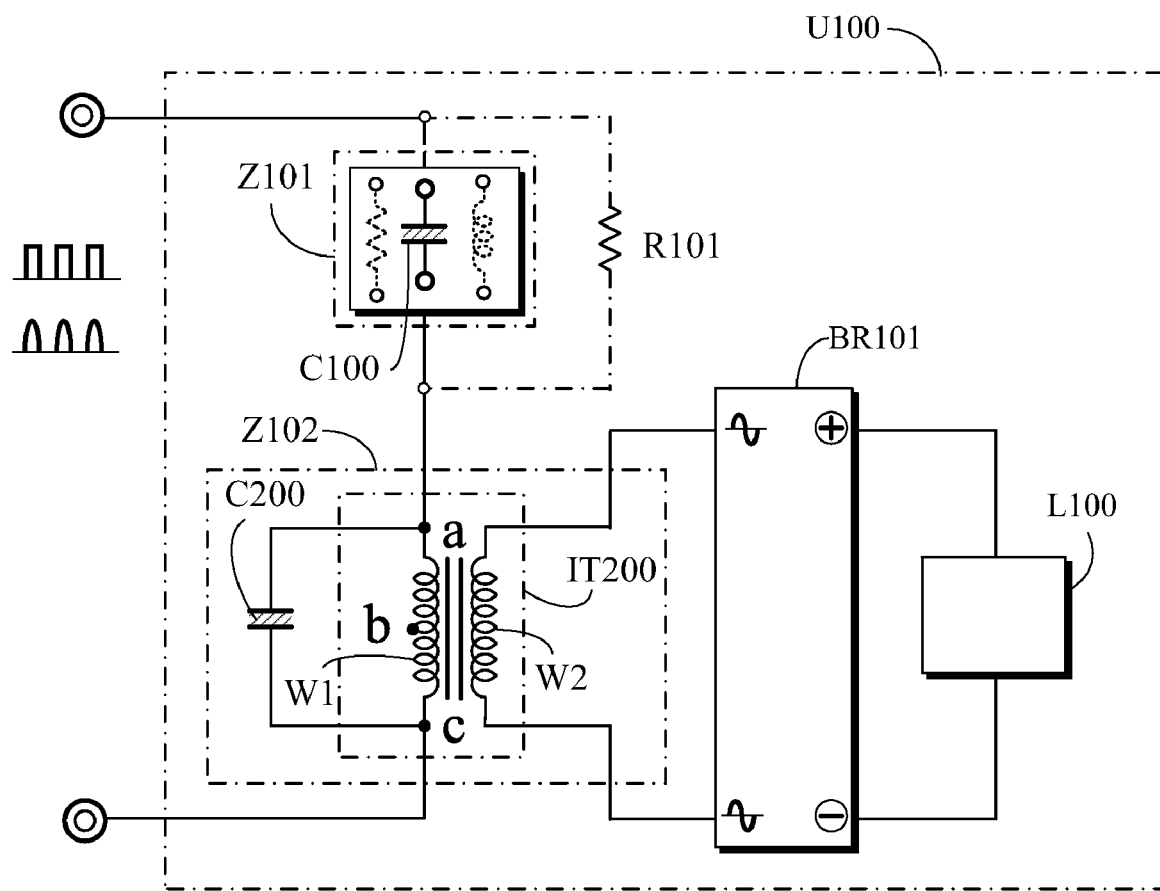
FIG. 13 is a circuit example schematic diagram of the present invention illustrating that the inductive impedance component of the second impedance is replaced by the primary side winding of the separating type transformer with separating type voltage change winding.

The uni-directional light emitting diode drive circuit in pulsed power parallel resonance, in which the optionally installed inductive impedance component (I200) of the second impedance (Z102) can be further replaced by the power supply side winding of a transformer with inductive effect, whereof the transformer can be a self-coupled transformer (ST200) with self-coupled voltage change winding or a transformer (IT200) with separating type voltage change winding;

FIG. 11 is a circuit example schematic diagram of the present invention illustrating that the inductive impedance component of the second impedance is replaced by the self-coupled voltage change power supply side winding of the self-coupled transformer thereby to constitute a voltage rise, whereof as shown in FIG. 11, the self-coupled transformer (ST200) has a self-coupled voltage change winding (W0) with voltage raising function, the b, c taps of the self-coupled voltage change winding (W0) of the self-coupled transformer (ST200) are the power supply side which replace the inductive impedance component (I200) of the second impedance (Z102) to be parallel connected with a capacitor (C200), whereof its inherent parallel resonance frequency after the parallel connection is the same as the pulse period of the pulsed power from the power source to appear a parallel resonance status, thereby to constitute the second impedance (Z102) which is series connected with the capacitor (C100) of the first impedance (Z101), further the capacitor (C200) can be optionally parallel connected with the a, c taps or b, c taps of the self-coupled transformer (ST200), or other selected taps as needed, whereof the a, c output taps of the self-coupled voltage change winding (W0) of the self-coupled transformer (ST200) are arranged to output AC power of voltage rise for transmitting to the AC input ends of the rectifier device (BR101), while the DC output ends of the rectifier device (BR101) are used to drive the uni-directional conducting light emitting diode set (L100);

FIG. 12 is a circuit example schematic diagram of the present invention illustrating that the inductive impedance component of the second impedance is replaced by the self-coupled voltage change power supply side winding of the self-coupled transformer thereby to constitute a voltage drop, whereof as shown in FIG. 12, the self-coupled transformer (ST200) has a self-coupled voltage change winding (W0) with voltage drop function, the a, c ends of the self-coupled voltage change winding (W0) of the self-coupled transformer (ST200) are the power supply side which replace the inductive impedance component (I200) of the second impedance (Z102) to be parallel connected with the capacitor (C200), whereof its parallel resonance frequency after parallel connection is the same the pulse period of the pulsed power from the power source to appear a parallel resonance status, thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, whereof the b, c output ends of the self-coupled voltage change winding (W0) of the self-coupled transformer (ST200) are arranged to output AC power of voltage drop for transmitting to the AC input ends of the rectifier device (BR101), while the DC output ends of the rectifier device (BR101) are used to drive the unidirectional conducting light emitting diode set (L100);

FIG. 13 is a circuit example schematic diagram of the present invention illustrating that the inductive impedance component of the second impedance is replaced by the primary side winding of the separating type transformer with separating type voltage change winding, whereof as shown in FIG. 13.

Color of the individual light emitting diodes (LED101) of the uni-directional conducting light emitting diode set (L100) in the unidirectional light emitting diode drive circuit (U100) of the unidirectional light emitting diode drive circuit in pulsed power parallel resonance can be optionally selected to be constituted by one or more than one colors.

The relationships of location arrangement between the individual light emitting diodes (LED101) of the unidirectional conducting light emitting diode set (L100) in the unidirectional light emitting diode drive circuit (U100) of the unidirectional light emitting diode drive circuit in pulsed power parallel resonance include the following: 1) sequentially linear arrangement; 2) sequentially distributed in a plane; 3) crisscross-linear arrangement; 4) crisscross distribution in a plane; 5) arrangement based on particular geometric positions in a plane; 6) arrangement based on 3D geometric position.

The unidirectional light emitting diode drive circuit in pulsed power parallel resonance, in which the embodiments of its unidirectional light emitting diode drive circuit (U100) are constituted by circuit components which include: 1) It is constituted by individual circuit components which are inter-connected; 2) At least two circuit components are combined to at least two partial functioning units which are further inter-connected; 3) All components are integrated together to one structure.

As is summarized from above descriptions, progressive performances of power saving, low heat loss and low cost can be provided by the uni-directional light emitting diode drive circuit in pulsed power parallel resonance through the charging/discharging by the uni-polar capacitor to drive the light emitting diode.

The invention claimed is:

1. A uni-directional light emitting diode drive circuit in pulsed power parallel resonance wherein a pulsed power is used as the power source, a first impedance includes a capacitive impedance component, or an inductive impedance component or a resistive impedance component, and a second impedance includes an inductive impedance component and a capacitive impedance component in parallel connection, wherein its inherent parallel resonance frequency is the same as a pulse period of the pulsed power to appear parallel resonance status, wherein the two ends of the first impedance and the second impedance in series connection are provided to receive a DC pulsed power input which includes the following:

1) DC pulsed power; or
 2) the DC pulsed power with constant or variable voltage and constant or variable periods converted from DC power source; or 3) the DC pulsed power with constant or variable voltage and constant or variable periods converted from DC power which is further rectified from AC power; or
 4) half-wave or full-wave DC pulsed power rectified from AC power with constant or variable voltage and constant or variable frequency;
    the DC pulsed power input is divided by the first impedance and the second impedance of parallel resonance in series connection, wherein the divided power is rectified by a rectifier device to a uni-directional DC power to drive the uni-directional conducting light emitting diode, wherein when a high frequency pulsed power is used in the uni-directional light emitting diode drive circuit in pulsed power parallel resonance, its volume and weight can be effectively reduced as well as that the cost can be lowered;
    the uni-directional light emitting diode drive circuit in pulsed power parallel resonance of the present invention, wherein at least one capacitive impedance component, or inductive impedance component or resistive impedance component constitute the first impedance, while the second impedance includes at least one capacitive impedance component and at least one inductive impedance component in parallel connection, wherein in a pulsed power input, their inherent parallel resonance frequency after the parallel connection is the same as the pulse period of the pulsed power to appear parallel resonance status;

the two ends of the first impedance and the second impedance in series connection are provided to receive the pulsed power input from power source, whereby the pulsed power from power source forms the divided power at the second impedance in parallel resonance, and the said corresponding divided power of the second impedance in parallel resonance is provided to AC input ends of a rectifier device, and through DC output ends of the said rectifier device to provide DC power output;

a uni-directional conducting light emitting diode set including at least one light emitting diode is arranged to be driven by the DC power outputted from the rectifier device;

the AC input ends of at least one rectifier device are arranged to receive the divided power from the two ends of the first impedance, or to receive the divided power from the second impedance;

the rectified DC power is arranged to drive the uni-directional conducting light emitting diode set, whereby to constitute the uni-directional light emitting diode drive circuit in pulsed power parallel resonance of the present invention; wherein:

a first impedance (Z101) includes:

1) capacitive impedance components, or inductive impedance components or resistive impedance components, wherein it can be optionally installed as needed one kind or more than one kind and one or more than one impedance components, or can be optionally installed as needed by two or more than two kinds of impedance components, wherein each kind of impedance components can be respectively one or more than one in series connection, or parallel connection, or series and parallel connection; or 2) the at least one capacitive impedance component and at least one inductive impedance component in series connection, wherein the inherent series resonance frequency of the two after series connection is the same as the period of a DC power of periodically alternated polarity, thereby to appear series resonance status; or 3) at least one capacitive impedance component and at least one inductive impedance component in parallel connection, wherein the inherent parallel resonance frequency of the two after parallel connection is the same as the period of a DC power of periodically alternated polarity, thereby to appear series resonance status;

a second impedance (Z102) includes at least one inductive impedance component and at least one capacitor (C200) in parallel connection, wherein their inherent parallel resonance frequency after parallel connection is the same as the pulse period of the pulsed power to appear a low consumption power storage status and an end voltage status in alternated polarities of corresponding parallel resonance frequency;

said uni-directional light emitting diode drive circuit in pulsed power parallel resonance can be optionally installed with capacitive, inductive or resistive impedance components as needed, wherein the first impedance (Z101) includes at least one of said three types of impedance components;

said uni-directional light emitting diode drive circuit in pulsed power parallel resonance, wherein the first impedance (Z101) can be selected not to be installed while the second impedance (Z102) is directly parallel connected with the pulsed power source to appear parallel resonance;

a rectifier device (BR101) parallel connected across the two ends of the first impedance (Z101) or the second impedance (Z102), or parallel connected across the two ends of the first impedance (Z101) and the two ends of the second impedance (Z102) simultaneously, wherein the divided power across the two ends of the first impedance (Z101) or the second impedance (Z102) is rectified to the DC power, whereby to drive the uni-directional conducting light emitting diode set (L100);

the rectifier device can be constituted by include a bridge type rectifier device or by a half-wave rectifier device, wherein the number of rectifier device (BR101) can be one or more than one;

a uni-directional conducting light emitting diode set (L100) including a forward current polarity light emitting diode, or two or more than two forward current polarity light emitting diodes in series connection or parallel connection, or three or more than three forward current polarity light emitting diodes in series connection, parallel connection or series and parallel connection;

the uni-directional conducting light emitting diode set (L100) can be selected to be installed one set or more than one set as needed, wherein it is arranged to be driven by DC power outputted from the rectifier device (BR101);

the first impedance (Z101), the second impedance (Z102), the rectifier device (BR101) and the uni-directional conducting light emitting diode set (L100) as well as the light emitting diode (LED101) and various optional auxiliary circuit components are based on application needs, wherein they can be optionally installed or not installed as needed and the installation installed quantity includes one, wherein if more than one are selected, the corresponding polarity relationship shall be determined based on circuit function requirement to execute series connection, or parallel connection, or series and parallel connections.

2. A uni-directional light emitting diode drive circuit in pulsed power parallel resonance as claimed in claim 1, wherein it is mainly comprised of:

a first impedance (Z101) including at least one capacitor (C100) with especially referring to a bipolar capacitor, wherein the quantity of the first impedance is one or more than ones, or the first impedance (Z101) can be optionally selected not to use as needed;

a second impedance (Z102) including at least one capacitor (C200) and at least one inductive impedance component (1200) in parallel connection with specially referring to the constitution by inductive impedance component and bipolar capacitor, wherein its frequency is the same as the pulse period of the pulsed power to appear parallel resonance status; the quantity of the second impedance is one or more than ones;

at least one first impedance (Z101) and at least one second impedance (Z102) are in series connection, wherein the two ends of the two after series connection are provided with a pulsed power input, whereby the divided power formed across the two ends of the second impedance (Z102) in parallel resonance is provided to the AC input ends of the rectifier device (BR101), whereby the rectified power is used to drive at least one uni-directional conducting light emitting diode set (L100);

the rectifier device (BR101) installed to receive the divided power from the two ends of the first impedance (Z101) or the second impedance (Z102), or two or more than two rectifier devices (BR101) are installed to respectively receive the divided power from the two ends of the first impedance (Z101) or the second impedance (Z102) thereby the divided power across the two ends of the first impedance (Z101) or the second impedance (Z102) is rectified to DC power to drive the uni-directional conducting light emitting diode set (L100);

the rectifier device can comprise a bridge type rectifier device or by a half-wave rectifier device, wherein the number of rectifier device (BR101) can be one or more than one;

a uni-directional conducting light emitting diode set (L100) including a forward current polarity light emitting diode (LED101), or two or more than two forward current polarity light emitting diodes (LED101) in series connection or parallel connection, or three or more than three forward current polarity light emitting diodes (LED101) in series connection, parallel connection, or series and parallel connection, wherein one or more than one uni-directional conducting light emitting diode set (L100) can be optionally installed as needed to be driven by the DC power outputted from the rectifier device (BR101);

the AC input ends of the rectifier device (BR101) is provided to receive the corresponding divided power in parallel resonance across the two ends of the second impedance (Z102) to drive the uni-directional conducting light emitting diode set (L100), whereby to limit its current by the first impedance (Z101), wherein if the capacitor (C100) is selected to constitute the first impedance (Z101), its capacity impedance is used to limit the output current;

a discharge resistor (R101) is optionally installed, wherein when the capacitor (C100) is selected to constitute the first impedance (Z101), it is parallel connected across the two ends of the capacitor (C100) to release the residual charge of capacitor (C100);

a current limit resistor (R103) is optionally installed to be individually series connected with each of light emitting diodes (LED101) which constitute the uni-directional conducting light emitting diode set (L100), whereby to limit the current passing through the light emitting diode (LED101); wherein the current limit resistor (R103) can also be replaced by an inductive impedance component (1103);

thereby, based on said circuit structure by connecting the first impedance (Z101), the second impedance (Z102), the rectifier device (BR101) and the uni-directional conducting light emitting diode set (L100) to constitute the uni-directional light emitting diode drive circuit (U100).

3. A uni-directional light emitting diode drive circuit in pulsed power parallel resonance as claimed in claim 1, wherein the uni-directional conducting light emitting diode set (L100) in the uni-directional light emitting diode drive circuit (U100) is through the divided power distribution effect by the parallel connection between the rectifier device (BR101) and the second impedance (Z102) to reduce the voltage variation rate across the two ends of uni-directional conducting light emitting diode set (L100) corresponding to the power source of voltage variation.

4. A uni-directional light emitting diode drive circuit in pulsed power parallel resonance as claimed in claim 1, wherein to protect the light emitting diode and to avoid the light emitting diode (LED101) being damaged or reduced working life by abnormal voltage, a zener diode can be further parallel connected across the two ends of the light emitting diode (LED101) of the uni-directional conducting light emitting diode set (L100) in the uni-directional light emitting diode drive circuit (U100) of the uni-directional light emitting diode drive circuit in pulsed power parallel resonance, or the zener diode can be first series connected with at least one diode to jointly produce the function of zener voltage effect, then to be parallel connected across the two ends of the light emitting diode (LED101); wherein:

a zener diode (ZD101) is parallel connected across the two ends of the light emitting diode (LED101) of the uni-directional conducting light emitting diode set (L100) in the uni-directional light emitting diode drive circuit (U100), wherein their polarity relationship is that the zener voltage of the zener diode (ZD101) is used to limit the working voltage across the two ends of the light emitting diode (LED101);

a zener diode (ZD101) is parallel connected across the two ends of the light emitting diode (LED101) of the uni-directional conducting light emitting diode set (L100) in the uni-directional light emitting diode drive circuit (U100), wherein the said zener diode (ZD101) can be optionally series connected with a diode (CR201) as needed to produce the zener voltage effect together, whereby the advantages are 1) the zener diode (ZD101) can be protected from abnormal reverse voltage; 2) both diode (CR201) and zener diode (ZD101) have temperature compensation effect.

5. A uni-directional light emitting diode drive circuit in pulsed power parallel resonance as claimed in claim 1, wherein to promote the lighting stability of the light source produced by the light emitting diode in the uni-directional light emitting diode drive circuit (U100), the light emitting diode (LED101) can be further installed with a charge/discharge device (ESD101), wherein random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously; wherein:

the uni-directional conducting light emitting diode set (L100) can be further installed with a charge/discharge device (ESD101) including to be parallel connected across the two ends of the light emitting diode (LED101) and the current limit resistor (R103) in series connection, or across the two ends of the light emitting diode (LED101) according to polarities, wherein random power charging or discharging can be provided by the charge/discharge device (ESD101) to stabilize the lighting stability of the light emitting diode (LED101), whereby to reduce its lighting pulsation, or in case of power supply off, reserved power can be supplied by the charge/discharge device (ESD101) to drive the light emitting diode (LED101) to emit light continuously;

said charge/discharge device (ESD101) can include conventional charging and discharging batteries, or supercapacitors or capacitors.

6. A uni-directional light emitting diode drive circuit in pulsed power parallel resonance as claimed in claim 1, wherein in the uni-directional light emitting diode drive circuit (U100):
  a uni-directional conducting light emitting diode set (L100) or more than one uni-directional conducting light emitting diode sets (L100) in series connection, parallel connection, or series and parallel connection can be optionally installed as needed in the uni-directional conducting light emitting diode set (L100), wherein if one or more than one sets is installed, it can be driven by the divided power of a common impedance (Z102) through its matched rectifier device (BR101), or it can be individually driven by the divided power of multiple second impedances (Z102) in series or parallel connection, wherein each of the multiple second impedances (Z102) is installed with a rectifier device (BR101) individually to drive its corresponding matched uni-directional conducting light emitting diode set (L100) individually.

7. A uni-directional light emitting diode drive circuit in pulsed power parallel resonance as claimed in claim 1, wherein a charge/discharge device (ESD101) is installed in the uni-directional light emitting diode drive circuit (U100), the light emitting diode (LED101) of the uni-directional conducting light emitting diode set (L100) is driven by continuous DC power to emit light.

8. A uni-directional light emitting diode drive circuit in pulsed power parallel resonance as claimed in claim 1, wherein if the charge/discharge device (ESD101) is not installed, current conduction to light emitting diode (LED101) is intermittent, whereby referring to the input voltage wave shape and duty cycle of current conduction, the light emitting forward current and the peak of light emitting forward voltage of each light emitting diode in the uni-directional conducting light emitting diode set (L100) can be correspondingly selected for the light emitting diode (LED101); if current conduction to light emitting diode (LED101) is intermittent, the peak of light emitting forward voltage can be correspondingly selected based on the duty cycle of current conduction as long as the principle of that the peak of light emitting forward voltage does not damage the light emitting diode (LED101) is followed.

9. A uni-directional light emitting diode drive circuit in pulsed power parallel resonance as claimed in claim 1, if the charge/discharge device (ESD101) is not installed, then based on the value and wave shape of the light emitting forward voltage, the corresponding current value and wave shape from the forward voltage vs. forward current ratio are produced; however the peak of light emitting forward current shall follow the principle not to damage the light emitting diode (LED101).

10. A uni-directional light emitting diode drive circuit in pulsed power parallel resonance as claimed in claim 1, wherein in the application of the uni-directional light emitting diode drive circuit (U100), the following different types of DC power can be provided for inputs, wherein the pulsed power includes:
  1) DC pulsed power; or
  2) the DC pulsed power with constant or variable voltage and constant or variable periods converted from DC power source; or
  3) the DC pulsed power with constant or variable voltage and constant or variable periods converted from DC power which is further rectified from AC power; or
  4) half-wave or full-wave DC pulsed power rectified from AC power with constant or variable voltage and constant or variable frequency.

11. A uni-directional light emitting diode drive circuit in pulsed power parallel resonance as claimed in claim 1, wherein it is series connected to the power modulator of series connection type, wherein the power modulator of series connection type includes the following:
  a DC power modulator of series connection type (330) including conventional electromechanical components or solid state power components and related electronic circuit components to modulate the DC pulsed power output;
  a bi-directional power modulator of series connection type (300) including conventional electromechanical components or solid state power components and related electronic circuit components to modulate the bi-directional power output;
  the circuit operating functions are the following:
  1) the DC power modulator of series connection type (330) is series connected with the uni-directional light emitting diode drive circuit (U100) to receive the DC pulsed power from power source, whereby the DC pulsed power is modulated by the DC power modulator of series connection type (330) to execute power modulations such as pulse width modulation or current conduction phase angle control, or impedance modulation to drive the uni-directional light emitting diode drive circuit (U100); or
  2) the bi-directional power modulator of series connection type (300) is series connected between the second impedance (Z102) and the AC input ends of the rectifier device (BR101) whereby the bi-directional AC divided power in parallel resonance from the two ends of the second impedance (Z102) is modulated by the bi-directional power modulator of series connection type (300) to execute power modulations such as pulse width modulation or current conduction phase angle control, or impedance modulation to drive the uni-directional conducting light emitting diode set (L100) through the rectifier device (BR101); or
  3) the DC power modulator of series connection type (330) is series connected between the DC output ends of the rectifier device (BR101) and the uni-directional conducting light emitting diode set (L100), whereby DC power from the rectifier device (BR101) is modulated by the DC power modulator of series connection type (330) to execute power modulations such as pulse width modulation or current conduction phase angle control, or impedance modulation to drive the uni-directional conducting light emitting diode set (L100).

12. A uni-directional light emitting diode drive circuit in pulsed power parallel resonance as claimed in claim 1, wherein it is parallel connected to a power modulator of parallel connection type, wherein the power modulator of parallel connection type includes the following:
  a DC power modulator of parallel connection type (430) including conventional electromechanical components or solid state power components and related electronic circuit components to modulate the output power of DC pulsed power;
  a bi-directional power modulator of parallel connection type (400) including conventional electromechanical components or solid state power components and related electronic circuit components to modulate the output power of the bi-directional power;
  the circuit operating functions are as following:

1) the DC power modulator of parallel connection type (430) is installed, wherein its output ends are for parallel connection with the uni-directional light emitting diode drive circuit (U100), while its input ends are provided for receiving the DC pulsed power from the power source, whereby the DC pulsed power is modulated by the DC power modulator of parallel connection type (430) to execute power modulations such as pulse width modulation or current conduction phase angle control, or impedance modulation to drive the uni-directional light emitting diode drive circuit (U100); or 2) the bi-directional power modulator of parallel connection type (400) is installed, wherein its output ends are parallel connected with the AC input ends of the rectifier device (BR101) while its input ends are parallel connected with the second impedance (Z102), whereby the bi-directional AC divided power in parallel resonance from the two ends of the second impedance (Z102) is modulated by the bi-directional power modulator of parallel connection type (400) to execute power modulations such as pulse width modulation or current conduction phase angle control, or impedance modulation whereby to be rectified to DC power by the rectifier device (BR101) so as to drive the uni-directional conducting light emitting diode set (L100); or 3) the DC power modulator of parallel connection type (430) is installed, wherein its output ends are parallel connected with the uni-directional conducting light emitting diode set (L100), while its input ends are parallel connected with the DC output ends of the rectifier device (BR101), whereby the DC power from the rectifier device (BR101) is modulated by the DC power modulator of parallel connection type (430) to execute power modulations such as pulse width modulation or current conduction phase angle control, or impedance modulation to drive the uni-directional conducting light emitting diode set (L100).

13. A uni-directional light emitting diode drive circuit in pulsed power parallel resonance as claimed in claim 1, wherein it is driven by the power outputted from a DC to DC converter, wherein:

a DC to DC converter (5000) including conventional electromechanical components or solid state power components and related electronic circuit components, wherein its input ends receive DC power while its output ends provide output which can be optionally selected as needed to be a DC pulsed power with constant or variable voltage and constant or variable periods;

the circuit operating functions are as following:

a DC to DC converter (5000), in which its input ends receive DC power while its output ends provide DC pulsed power, wherein the uni-directional light emitting diode drive circuit (U100) is parallel connected with the output ends of the DC to DC converter (5000); wherein the input ends of the DC to DC converter are arranged to receive the optionally selected DC power with constant or variable voltage, or the DC power rectified from AC power;

the output provided by the output ends of the DC to DC converter (5000) can be optionally selected as needed to be a DC pulsed power with constant or variable voltage and constant or variable periods to control and drive the uni-directional light emitting diode drive circuit (U100);

in addition, the uni-directional light emitting diode drive circuit (U100) can be controlled and driven by modulating the output power from the DC to DC converter (5000), or by executing power modulation such as pulse width modulation or current conduction phase angle control, or impedance modulation, etc to the power outputted.

14. A uni-directional light emitting diode drive circuit in pulsed power parallel resonance as claimed in claim 1, wherein the uni-directional light emitting diode drive circuit (U100) is arranged to be series connected with at least one conventional impedance component (500) and further to be parallel connected with the power source, wherein the impedance (500) includes:

1) a component with capacitive impedance characteristics; or
2) a component with inductive impedance characteristics; or
3) a component with resistive impedance characteristics; or
4) a single impedance component with the combined impedance characteristics of at least two of the resistive impedance, or inductive impedance, or capacitive impedance simultaneously, thereby to provide DC or AC impedances; or
5) a single impedance component with the combined impedance characteristics of capacitive impedance and inductive impedance, wherein its inherent resonance frequency is the same as the frequency or period of bi-directional or uni-directional pulsed power, thereby to produce a parallel resonance status; or
6) capacitive impedance components, or inductive impedance components, or resistive impedance components, including one or more than one kind of one and more than one impedance component, or two or more than two kinds of impedance components in series connection, or parallel connection, or series and parallel connections, thereby to provide a DC or AC impedance; or
7) the mutual series connection of a capacitive impedance component and an inductive impedance component, wherein its inherent series resonance frequency is the same as the frequency or period of bi-directional or uni-directional pulsed power, thereby to produce a series resonance status and the end voltage across two ends of the capacitive impedance component or the inductive impedance component appear in series resonance correspondingly;

or the capacitive impedance and the inductive impedance are in mutual parallel connection, whereby its inherent parallel resonance frequency is the same as the frequency or period of bi-directional or uni-directional pulsed power, thereby to produce a parallel resonance status and appear the corresponding end voltage.

15. A uni-directional light emitting diode drive circuit in pulsed power parallel resonance as claimed in claim 1, wherein the optionally installed inductive impedance component (1200) of the second impedance (Z102) can be further replaced by the power supply side winding of a transformer with inductive effect, wherein the self-coupled transformer (ST200) has a self-coupled voltage change winding (W0) with voltage raising function, the b, c taps of the self-coupled voltage change winding (W0) of the self-coupled transformer (ST200) are the power supply side which replace the inductive impedance component (I200) of the second impedance (Z102) to be parallel connected with a capacitor (C200), wherein its inherent parallel resonance frequency after the parallel connection is the same as the pulse period of the pulsed power from the power source to appear a parallel resonance status, thereby to constitute the second impedance (Z102) which is series connected with the capacitor (C100) of the first impedance (Z101), further the capacitor (C200) can be optionally parallel connected with the a, c taps or b, c taps of the self-coupled transformer (ST200), or other selected taps as needed, wherein the a, c output taps of the self-coupled voltage change winding (W0) of the self-coupled transformer (ST200) are arranged to output AC power of voltage rise for transmitting to the AC input ends of the rectifier device (BR101), while the DC output ends of the rectifier device (BR101) are used to drive the uni-directional conducting light emitting diode set (L100).

16. A uni-directional light emitting diode drive circuit in pulsed power parallel resonance as claimed in claim 1, wherein the optionally installed inductive impedance component (I200) of the second impedance (Z102) can be further replaced by the power supply side winding of a transformer with inductive effect, wherein the self-coupled transformer (ST200) has a self-coupled voltage change winding (W0) with voltage drop function, the a, c ends of the self-coupled voltage change winding (W0) of the self-coupled transformer (ST200) are the power supply side which replace the inductive impedance component (I200) of the second impedance (Z102) to be parallel connected with the capacitor (C200), wherein its parallel resonance frequency after parallel connection is the same the pulse period of the pulsed power from the power source to appear a parallel resonance status, thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, wherein the b, c output ends of the self-coupled voltage change winding (W0) of the self-coupled transformer (ST200) are arranged to output AC power of voltage drop for transmitting to the AC input ends of the rectifier device (BR101), while the DC output ends of the rectifier device (BR101) are used to drive the uni-directional conducting light emitting diode set (L100).

17. A uni-directional light emitting diode drive circuit in pulsed power parallel resonance as claimed in claim 1, wherein the optionally installed inductive impedance component (I200) of the second impedance (Z102) can be further replaced by the power supply side winding of a transformer with inductive effect, wherein the separating type transformer (IT200) is comprised of a primary side winding (W1) and a secondary side winding (W2), in which the primary side winding (W1) and the secondary side winding (W2) are separated, wherein the primary side winding (W1) is parallel connected with the capacitor (C200), wherein its inherent parallel resonance frequency after parallel connection is the same as the pulse period of the pulsed power from the power source to appear a parallel resonance status, thereby to constitute the second impedance (Z102) which is series connected with the capacitor (C100) of the first impedance (Z101), further, the capacitor (C200) can be optionally parallel connected with the a, c taps or b, c taps of the self-coupled transformer (ST200), or other selected taps as needed, wherein the output voltage of the secondary side winding (W2) of the separating type transformer (IT200) can be optionally selected to provide AC power of either voltage rise or voltage drop, wherein the AC power outputted from the secondary side winding (W2) is arranged to transmit to the AC input ends of the rectifier device (BR101), while the DC output ends of the rectifier device (BR101) are used to transmit the DC power to the uni-directional conducting light emitting diode set (L100);

through the above description, the inductive impedance component (I200) of the second impedance (Z102) is replaced by the power supply side winding of the transformer and is parallel connected with the capacitor (C200) to appear parallel resonance, whereby to constitute the second impedance (Z102), wherein the secondary side of the separating type transformer (IT200) provides AC power of voltage rise or voltage drop to the AC input end of the rectifier device (BR101) while the DC output end of the rectifier device (BR101) is used to output DC power to drive the uni-directional conducting light emitting diode set (L100).

* * * * *